D. J. CANARY.
TIRE FOR WHEELS.
APPLICATION FILED MAY 10, 1912.
1,174,968.
Patented Mar. 14, 1916.
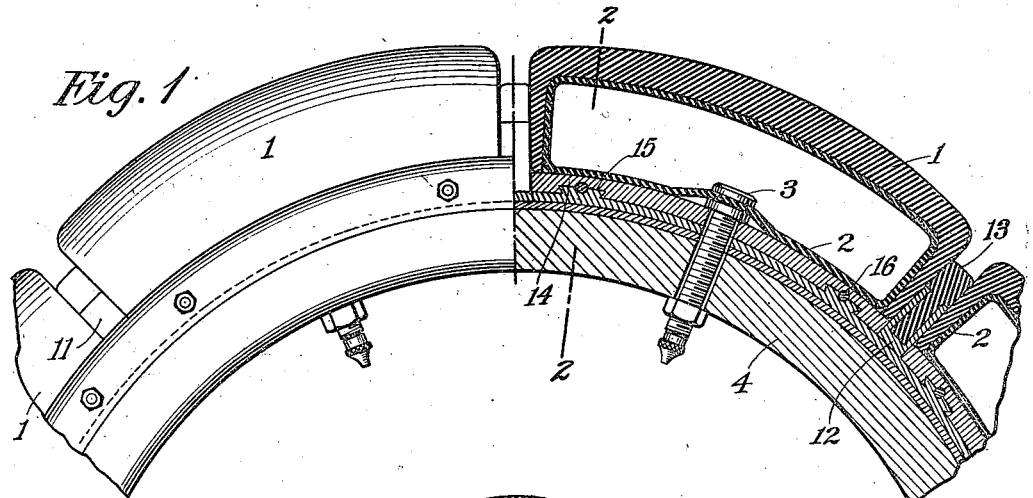
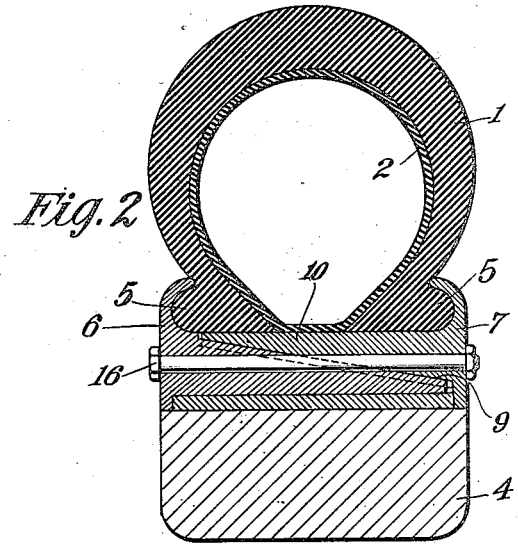
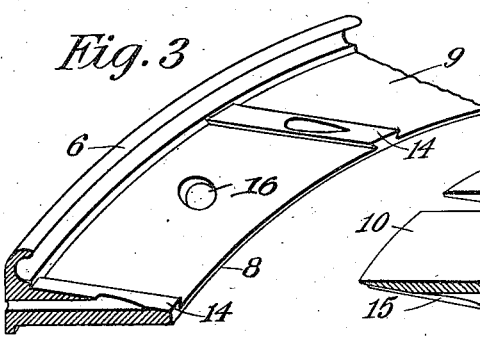
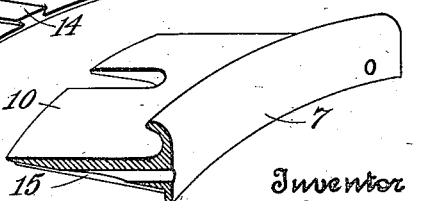
Witnesses:
S. C. Eaton
Mabel J. Cooper
Inventor
Daniel J. Canary,
By his Attorneys
Messimer & Austin

UNITED STATES PATENT OFFICE.

DANIEL J. CANARY, OF OAK PARK, ILLINOIS, ASSIGNOR OF ONE-HALF TO CHARLES M. RICHTER, OF CHICAGO, ILLINOIS.

TIRE FOR WHEELS.

1,174,968.　　　　　Specification of Letters Patent.　　Patented Mar. 14, 1916.

Application filed May 10, 1912. Serial No. 696,338.

*To all whom it may concern:*

Be it known that I, DANIEL J. CANARY, a citizen of the United States, residing at Oak Park, in the county of Cook and State of Illinois, have invented certain new and useful Improvements in Tires for Wheels, of which the following is a full, clear, and exact specification.

My invention relates to tires for wheels, and more particularly to that class in which the tires are composed of replaceable sections, and comprises an improved means for securing the sections in easily detachable engagement upon the wheel, in entirely independent relation so that one section may be replaced without in any way affecting the remainder of the wheel.

Referring to the drawings forming a part of this application in which the several reference numerals indicate similar parts throughout, Figure 1 is a side elevation of a portion of a wheel containing my improvements shown partly in section. Fig. 2 is a sectional view on the line 2—2 of Fig. 1. Fig. 3 is a portion of one side of the tire securing means in perspective and Fig. 4 is a portion of the opposite tire securing means in perspective.

My improved means for securing the sections of the tire in place is not limited to any particular kind of sections. It is however, especially adapted for a wheel formed of pneumatic sections, for the reason that the means devised separate each section by one of a series of end supports so that they are in no way dependent upon one another. This enables the replacement of one section for another without in any way interfering with the other sections forming the tire. The sections illustrated in the present embodiment comprise the outer inflatable covering 1 of rubber or other suitable material, and the inner tube or lining 2 likewise of rubber or other suitable material and provided with a nipple 3 of any usual construction projecting through the rim 4 of the wheel and through the intermediate members as will later be described. The sections are provided on either side with means for attaching them to the rim, as for instance the flanges or beads 5. These engage with correspondingly formed members, as the flange 6 on the one side, and the sectional flanges 7 on the other side. The flange 6 preferably extends entirely around the wheel and is formed on the circular band 8 fitted to the periphery of the wheel and having an inclined outer surface 9. Each flange 7 embraces a section of the tire and is formed upon a band section 10 having its inner surface inclined to correspond with the inclined surface 9. The outer surface of these sections are preferably perpendicular to the vertical in transverse cross section to afford a suitable seat for the respective sections of the tire. Supports 11 are formed on the band 8 to support the ends of the tire sections and to furthermore separate the sections so that they will be entirely independent of each other. A preferred form of support comprises the hollow metal block 12 in which is secured the block 13 of suitable material, such as rubber.

The continuous band 8 is provided with dove-tailed plates 14, and the band sections are likewise formed with dove-tailed grooves 15 for engaging the dove-tailed plates. Each section is here shown as having two such joints, but more may be used if desired. With such a securing of the band sections with the continuous band, it is not necessary that the two inclined surfaces be finished, it only being necessary that the finishing be done upon the dove-tailed joints themselves. The members are secured together preferably by bolts 16 passed through holes formed through the dove-tailed joints. Suitable perforations 16 and 17 are formed in the band 8 and band sections 10 for the admission of the nipple of the tire section.

All that is necessary when replacing a tire section is to remove the tire securing bolts and slide the band section outwardly sufficiently along its dove-tailed connections, to clear one side of the tire section from its engaging member. This permits the tire section to be withdrawn and another one put in its place. The end supports together with the dove-tailed connections and securing bolts make a strong construction, yet one from which the tire sections are easily removed.

Having thus described my invention, I claim—

1. A wheel rim comprising a metal band forming a continuous section having an inclined outer face extending substantially across the entire width of the wheel rim, a band section having an outer tire engaging portion and having a beveled inner portion adapted to engage and seat upon the inclined face of the band, a transverse rib on one of said sections adapted to interlock with a registering groove in the other section to prevent longitudinal movement of said sections with respect to each other, said rib having a fastening means extending therethrough to secure the sections in position.

2. A wheel rim comprising a metal band forming a continuous section having an inclined outer face extending substantially across the entire width of the wheel rim, a band section having an outer tire engaging portion and having a beveled inner portion adapted to engage and seat upon the inclined face of the band, a transverse rib on one of said sections adapted to interlock with a registering groove in the other section to prevent longitudinal movement of said sections with respect to each other, each of said sections having a transverse opening adapted to register with each other, and securing means passing through said openings entirely through the wheel rim.

3. A wheel rim comprising two superimposed sections, each having means for engaging one side of a tire section, the contacting surfaces of said sections being inclined toward the axis of the wheel, means between the sections for preventing relative movement circumferentially of the tire and section-fastening means extending transversely through said sections and through said inclined contacting surfaces.

4. A wheel rim comprising a band having a transversely inclined outer face and means for engaging one side of a tire section, a band section having a transversely inclined inner face slidable transversely on the outer face of said band and having means for engaging the opposite side of the tire section, a dove-tail connection between said band and band section and fastening means extending through said band and band section transversely of the tire for holding said band section removably in place.

DANIEL J. CANARY.

Witnesses:
  RAY LONG,
  F. E. NEJEDLY.